United States Patent
Crevits et al.

(10) Patent No.: US 7,257,211 B2
(45) Date of Patent: Aug. 14, 2007

(54) METHOD AND APPARATUS FOR CONTROLLING AND/OR MONITORING A MULAP LINE

(75) Inventors: Luc Crevits, Tielt (BE); Freddy De Clercq, Oostkamp (BE)

(73) Assignee: Siemens Aktiengesellschaft, Munich (DE)

( * ) Notice: Subject to any disclaimer, the term of this patent is extended or adjusted under 35 U.S.C. 154(b) by 667 days.

(21) Appl. No.: 10/655,610

(22) Filed: Sep. 5, 2003

(65) Prior Publication Data

US 2004/0120489 A1    Jun. 24, 2004

(30) Foreign Application Priority Data

Sep. 5, 2002   (DE) ................. 102 41 180

(51) Int. Cl.
H04M 1/56    (2006.01)
H04M 11/00   (2006.01)
H04M 1/00    (2006.01)

(52) U.S. Cl. .............. 379/142.07; 379/93.01; 379/93.07; 379/156

(58) Field of Classification Search ......... 379/142.07, 379/156, 160, 171, 93.01, 93.07
See application file for complete search history.

(56) References Cited

U.S. PATENT DOCUMENTS

| | | | |
|---|---|---|---|
| 4,351,986 A * | 9/1982 | Fechalos | 379/163 |
| 5,557,660 A | 9/1996 | Crevits et al. | |
| 5,809,111 A * | 9/1998 | Matthews | 379/31 |
| 5,978,469 A * | 11/1999 | Benson | 379/377 |
| 6,650,748 B1 * | 11/2003 | Edwards et al. | 379/266.04 |
| 6,674,842 B2 * | 1/2004 | Weinman, Jr. | 379/88.13 |
| 6,754,201 B1 * | 6/2004 | Griffin et al. | 370/352 |
| 6,798,767 B1 * | 9/2004 | Alexander et al. | 370/352 |

FOREIGN PATENT DOCUMENTS

| | | |
|---|---|---|
| DE | 101 20 072 | 11/2002 |
| EP | 0 535 602 | 4/1993 |
| EP | 1 172 992 | 1/2002 |
| GB | 2 323 251 | 9/1998 |

OTHER PUBLICATIONS

German Patent Office Action, mailed Feb. 19, 2007, and issued in priority German Patent Application No. 102 41 180.8-42.
Siemens, "Hi Path 3000" [Online] 2001, pp. 1-12, Retrieved from the Internet on Mar. 29, 2007: URL:http://www.siemens.hu/htm/ajanlataink/icn/download/a31002-h1000-a210-2-29.pdf.
Siemens, "HiPath AllServe 150 V1.0", Internet Citation, [Online] Feb. 2001, retrieved from the Internet on Oct. 13, 2003: URL: http://www.siemens.com.
European Search Report, mailed Apr. 16, 2007, and issued in corresponding European Patent Application No. 03017487.4-2414.

* cited by examiner

Primary Examiner—Bing Q. Bui
(74) Attorney, Agent, or Firm—Staas & Halsey LLP

(57) ABSTRACT

At least one MULAP line in a communication installation is controlled and/or monitored using an application. To simplify the combination of MULAP lines and CTI applications, or to allow it at all, each MULAP line has an associated MULAP call number, and a plurality of terminals can access these MULAP lines, each of the MULAP lines having a respective associated terminal as master terminal. First, the application sends an order for a MULAP call number to the communication installation. The communication installation then converts the MULAP call number into the terminal call number of the master terminal associated with this MULAP line and carries out the order for this terminal call number, all messages relating to MULAP line being sent as those associated with the master terminal from the communication installation to the application as messages associated with this MULAP call number.

4 Claims, 3 Drawing Sheets

METHOD AND APPARATUS FOR CONTROLLING AND/OR MONITORING A MULAP LINE

CROSS REFERENCE TO RELATED APPLICATIONS

This application is based on and hereby claims priority to German Application No. 10241180.8 filed on Sep. 5, 2002, the contents of which are hereby incorporated by reference.

BACKGROUND OF THE INVENTION

Voice communication systems are known in which precisely one terminal (telephone) is normally connected to each subscriber line. If it is possible to access a subscriber line from a plurality of terminals, however, such a line is referred to as MULAP (Multiple Line Appearance). Such circuits are frequently used for workgroups, where any employee can take calls arriving on a particular line. In this case, each terminal usually has a plurality of such MULAP lines connected to it which can be reached by internal and external subscribers on the respective call numbers (the "MULAP numbers"). Thus, in a company's sales department, for example, separate MULAP lines can be set up for order inquiries, technical information, delivery information and invoicing. Every terminal on which these MULAP lines are available then has a signal lamp and an access key (MULAP key) for each line. As soon as a customer calls on one of the MULAP lines, this call is signaled audibly on all of these terminals, the lamp associated with the line flashes and any subscriber in the workgroup can take the call by pressing the appropriate key.

Conversely, before dialing a call number, the employee can use the MULAP key for the purpose of specifically selecting a particular line. This line is then attributed the call charges, for example, the MULAP number for this line is transmitted to the called party, and the line is signaled to other callers as being "busy" for the duration of the call.

To control and monitor subscriber lines in private communication installations, special application programs installed on PCs are increasingly being used today. Such applications, also referred to as CTI (Computer Telephony Integration) applications, report incoming calls, for example, on the PC screen and in so doing indicate— according to availability—the caller's call number and name, the latter being ascertained from a telephone directory on the basis of this call number. In addition, CTI applications can also be used to set up connections by virtue of the ability to "dial" from address books and databases by "mouse click". For these purposes, the PC or a central server existing in the computer network is connected to the telephone terminal or to the communication installation so that dialing commands, state and call information can be interchanged. At the communication installation end, these connections normally use standardized interfaces, for example the CSTA (Computer Supported Telephony Application) interface. Such interfaces use a standardized command set which, depending on the version (in the case of CSTA the term "phase" is also used), supports various commands of different performance.

A drawback which has been found with the known communication installations and CTI applications is that MULAP lines can be controlled and monitored using CTI applications only with difficulty or incompletely. One reason for this is that CTI applications and the standardized interfaces are intended for controlling and monitoring individual terminals and not for MULAP lines or groups. To monitor MULAP lines, a CTI application therefore needs to monitor a plurality of call numbers simultaneously, inter alia a specially set-up "virtual" call number (i.e. an apparent subscriber line to which no terminal is connected) for ascertaining the call state and also an internally allocated call number for the master line for each MULAP line, which is not known to the user of the system. This call number is required for setting up connections from the CTI application. Customary CTI applications are not set up to control and monitor subscriber lines and terminals having a plurality of associated call numbers, however.

SUMMARY OF THE INVENTION

One aspect of invention is therefore based on the object of simplifying the combination of the MULAP lines and CTI applications.

For the method, the solution provides for the MULAP lines to be controlled and/or monitored using a plurality steps. In a first step, the application sends an order for a MULAP call number to the communication installation. In a further step, the communication installation converts the MULAP call number into the terminal call number for the master terminal associated with this MULAP line and carries out the order for this terminal call number, all messages relating to the MULAP line being sent as those associated with the master terminal from the communication installation to the application as messages associated with this MULAP call number. As a result, a MULAP line can be controlled and monitored by the CTI application like a normal subscriber line.

A CTI application is easily able to set up connections for each of the MULAP lines if each of the MULAP lines has a respective other associated terminal as master terminal.

If access to a MULAP line on a terminal other than the master terminal for this MULAP line results in a message being generated which relates to the master terminal for this MULAP line, then a state change on the MULAP line can be signaled in the CTI application even if call signaling on the master terminal is turned off.

For the arrangement, the solution provides for the arrangement to be provided for controlling and/or monitoring at least one MULAP line in a communication installation using an application, where each MULAP line has an associated MULAP call number, and a plurality of terminals can access the MULAP lines, where each of the MULAP lines has a respective associated terminal as master terminal, where the application sends an order for a MULAP call number to the communication installation, where a conversion unit is provided which converts the MULAP call number into the terminal call number of the master terminal associated with this MULAP line, and where the communication installation carries out the order for this terminal call number, all messages relating to the MULAP line being sent as those associated with the master terminal from the communication installation to the application as messages associated with this MULAP call number.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
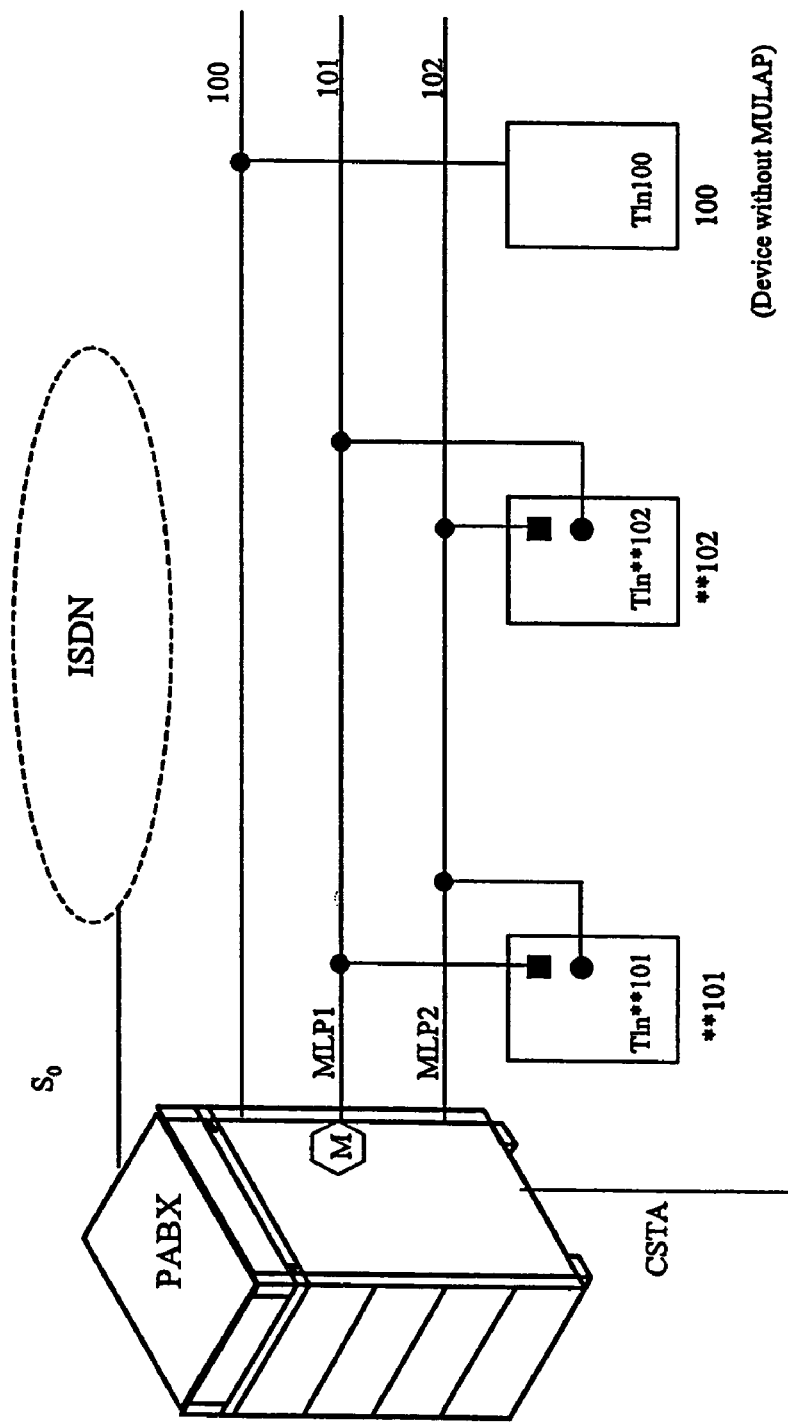
FIG. 1 shows a line-switched communication installation with three terminals and a PC.

Reference will now be made in detail to the preferred embodiments of the present invention, examples of which are illustrated in the accompanying drawings, wherein like reference numerals refer to like elements throughout.

FIG. 1 shows a line-switched private communication installation PABX which is connected to the public communication network ISDN by a digital exchange line $S_0$. The communication installation PABX is equipped with a CTI interface CSTA via which a computer PC is connected. The computer PC has a CTI application (not shown here) installed on it which is used to control and monitor terminals TLN\*\*101, TLN\*\*102, TLN100 in the form of telephones. The communication installation PABX has two subscriber lines MLP1, MLP2 set up as MULAP lines with the MULAP call numbers 101, 102. This MULAP line can also be accessed via the terminals TLN\*\*101, TLN\*\*102 using two respective keys with an associated lamp. The internal dialing association table in the communication installation PABX stores the terminal TLN\*\*101 with the internal call number \*\*101 and the terminal TLN\*\*102 with the internal call number \*\*102. These two call numbers\*\*101, \*\*102, used only in the communication installation's call-processing technology, denote within the communication installation the physical subscriber line to which these terminals are connected. These two call numbers \*\*101, \*\*102 are not known to the users, that is to say to the callers and to the user of the two terminals. The third telephony terminal TLN100 has no MULAP keys and can be reached using the internal call number 100, which is also used by the callers and is therefore known. The two MULAP terminals TLN\*\*101, TLN\*\*102, on the other hand, can be reached only by dialing one of the two MULAP call numbers 101, 102. In this case, both terminals ring and the lamp associated with the respective MULAP key indicates which of the two MULAP call numbers 101, 102 has been dialed by the caller. The call is then taken on one of the two terminals TLN\*\*101, TLN\*\*102 by pressing the key.

The CTI application installed on the computer PC is used to control and monitor subscribers in the communication installation PABX. Thus, a user of the CTI application can set up a connection between the terminal TLN100 and a subscriber in a public communication network ISDN by selecting the terminal TLN100 in a device list in the CTI application as the terminal which is to be controlled and then selecting the call number of the desired subscriber in the communication network ISDN in a telephone directory and pressing or clicking on a "dial key". By activating the "dial" function, a command sequence is sent from the computer PC via a connecting line to the interface CSTA in the communication installation PABX which contains, as parameters, the call number 100 of the terminal TLN100 which is to be controlled, the destination call number in the communication network ISDN and a control code for the "dial" command. As a result, the communication installation PABX sets up the desired connection.

The CTI application installed on the computer PC can also be used to monitor the terminal TLN100 by selecting the terminal TLN100 for monitoring from a list of all available terminals in the CTI application, in a similar manner to the method described above. When the monitoring process M starts, the CTI application sends the interface CSTA in the communication installation PABX a command sequence which contains, as parameters, the call number 100 of the terminal TLN100 and a control code for the "monitor" command. Within the communication installation PABX, this means that a monitoring routine is started which monitors whether a state change occurs on the subscriber line for the terminal TLN100. After any change, the communication installation PABX uses the interface CSTA to send an event message to the CTI application on the computer PC. This event message contains, as address statement, the call number 100 of the terminal TLN100 and a control code for the state change which has taken place. Such a state change can, by way of example, be a call which comes from the public communication network ISDN and enters the communication installation PABX for the subscriber line associated with the subscriber TLN100. Hence, the incoming call results not just in the terminal TLN100 ringing, but also in a message window opening on the screen of the computer PC, the message window indicating the waiting call and displaying the caller's transmitted call number. It goes without saying that it is also possible for the caller's call number to be stored for later use and for further added features to be implemented in the CTI application. The start of the monitoring process M for the subscriber line with the call number 100 is frequently referred to as "setting a monitor point".

The internal call numbers \*\*101, \*\*102 of the MULAP terminals TLN\*\*101, TLN\*\*102 are not known to the user of the PC and cannot be used as parameters in the CTI application either. In this case, the terminal TLN\*\*101 with the internal call number \*\*101 is associated with the MULAP line MLP1 having the MULAP number 101 as master terminal. A connection which is set up from the MULAP line 101 to an external or internal subscriber is managed within the communication installation as an outgoing call from the master terminal TLN\*\*101. The same applies to the MULAP line MLP2 with the terminal TLN\*\*102.

Figure 2:
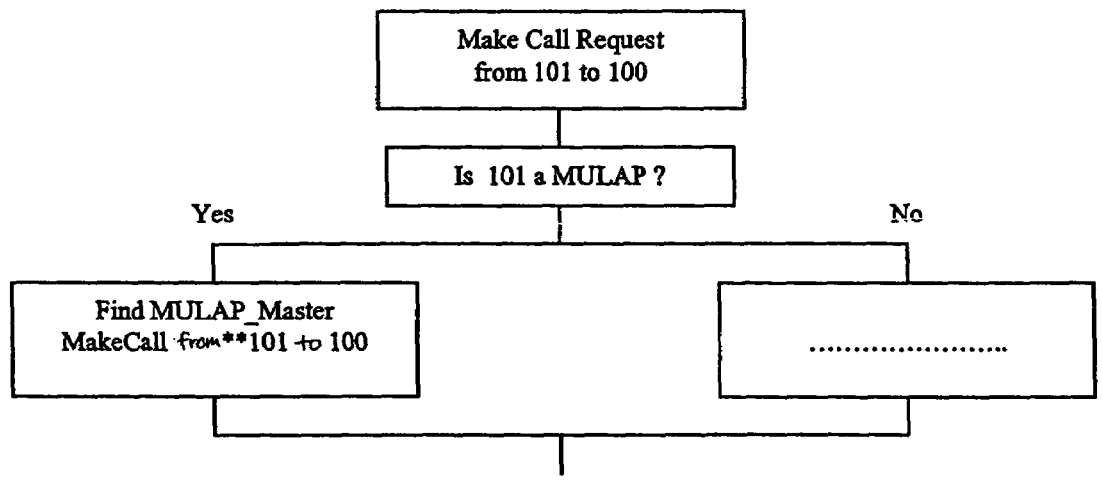
FIG. 2 shows the flow of CTI-controlled call setup from a MULAP master terminal to a non-MULAP terminal.

FIG. 2 describes the setup of a connection between the terminals TLN\*\*101 and hence the MULAP line MLP1 and an external subscriber in the communication network ISDN, the connection being initiated by the user of the CTI application on the computer PC. The user of the CTI application selects from the list of devices to be controlled the "terminal" with the call number 101, even though in reality this is not a terminal but instead the call number of the MULAP line MLPI. For the CTI application, the call number 101 is portrayed as a terminal in the communication with the communication installation PABX, however. Hence, the interface CSTA is used to send the communication installation PABX a command sequence which contains the "terminal" 101 as terminal which is to be controlled— also referred to as target hardware—and the call number of the external subscriber as connection destination and "dial" as command. In the communication installation PABX, the stored configuration data are now used to check whether the call number 101 is actually a terminal or whether 101 is a MULAP line. In the present case, 101 is a MULAP line which has an associated master terminal. From the configuration database, the communication installation PABX obtains the information that the MULAP line MLP1 with the MULAP call number 101 has the terminal TLN101 with the internal call number **101 associated with it. The command transmitted by the CTI application is now executed as though the data field for the "target hardware" had contained the call number **101. The communication installation PABX therefore activates the loudspeaker on the terminal TLN**101 and sets up the call to the external subscriber.

Figure 3:
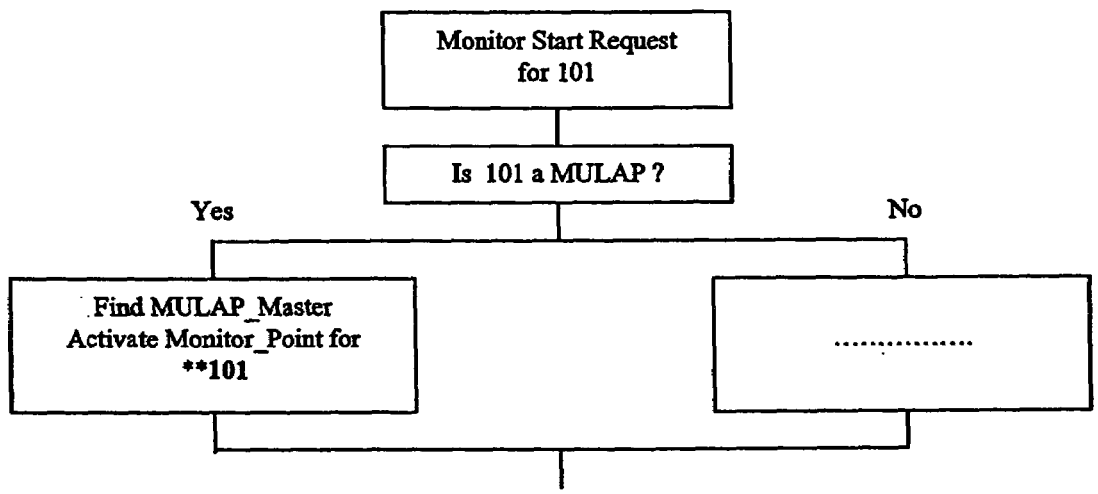
FIG. 3 shows the flow for the start of monitoring on a MULAP line.

FIG. 3 shows the start of monitoring of the MULAP line 101 via the CTI application in schematic form. The CTI application sends the communication installation PABX a command sequence which contains the call number 101 as the terminal which is to be monitored. The communication installation uses the stored configuration data to check the transmitted call number 101, and establishes that this is a MULAP call number whose master terminal has the internal call number **101 associated with it, and starts a monitoring process M for the line to which the master terminal **101 is connected.

As an example of an event which relates to the MULAP line 101 monitored in this fashion and which is reported to the CTI application, the text below describes the engagement of the MULAP line 101 by an internal subscriber in the communication installation PABX. The line is engaged by pressing the key associated with this MULAP line 101 on one of the terminals TIn**101, TIn**102.

Figure 4:
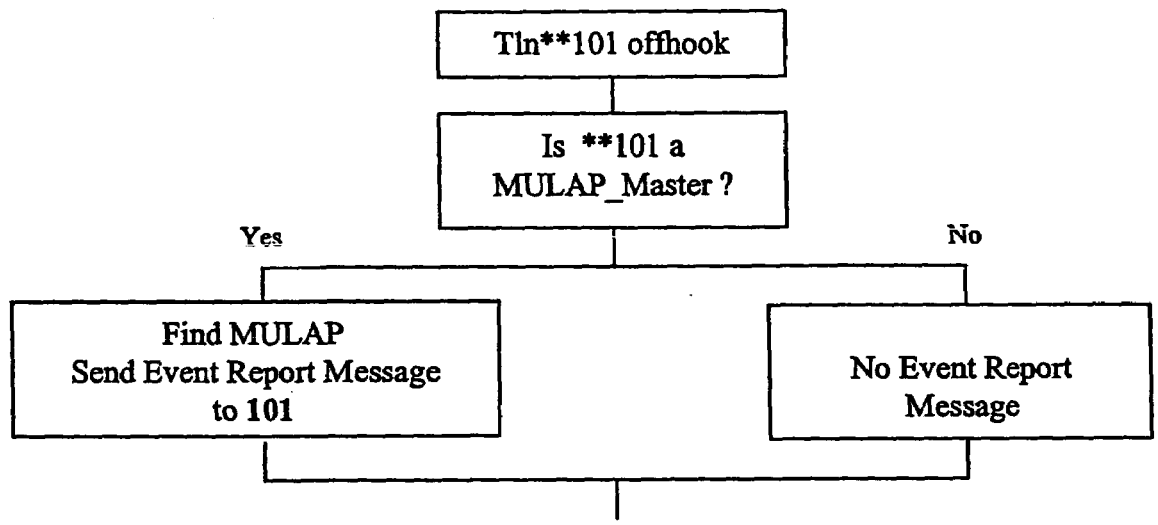
FIG. 4 shows the sending of a status message when the MULAP terminal **\*\*101 lifts the receiver.

In this context, FIG. 4 shows the progress of outgoing dialing from the terminal TIn**101. The subscriber lifts the receiver on the terminal TIn**101. In the communication installation, this action engages the MULAP line 101. At the same time, the monitoring process M started previously registers the state change on the subscriber line associated with the terminal TIn**101. The communication installation PABX then uses the stored configuration data to check whether the terminal TIn**101 associated with this subscriber line is a master terminal for a MULAP line. Since this is the case, the communication installation PABX sends the CTI application a message which describes the state change and contains the MULAP number 101 as the terminal call number in question.

Figure 5:
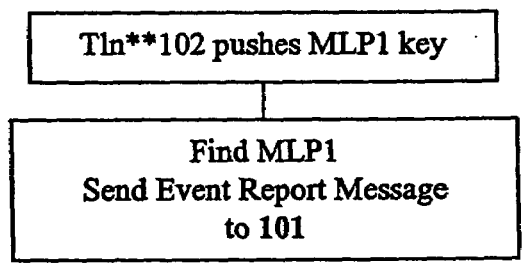
FIG. 5** shows the sending of a status message when a MULAP line on a non-MULAP master terminal becomes busy.

The situation in which the MULAP line MLP1 is being engaged by the terminal TIn**102, which is not the master terminal for this MULAP line MLP1, is outlined in FIG. 5. On the terminal TIn**102, the MULAP line MLP1 is engaged by pressing the key associated therewith. The communication installation uses the stored configuration data to establish that the MULAP line MLP1 is associated with the master terminal TIn**101, which is different than the terminal TIn**102 being used, and also checks whether a monitoring process M has been activated for the subscriber line associated with this master terminal TIn**101. Since this is the case, the communication installation PABX also sends the CTI application a message in this case describing the "line busy" state change and containing the MULAP number 101 as the terminal call number in question.

The invention has been described in detail with particular reference to preferred embodiments thereof and examples, but it will be understood that variations and modifications can be effected within the spirit and scope of the invention.

The invention claimed is:

1. A method for controlling and/or monitoring at least one MULAP multiple line appearance line in a communication installation using a computer telephony integration CTI application, comprising:

providing a plurality of terminals with access to the MULAP line through an associated MULAP call number such that each MULAP line has a respective master terminal, each terminal having a terminal call number;

sending an order from the CTI application for a MULAP call number to the communication installation;

converting the MULAP call number into a converted call number, the converted call number being the terminal call number of the master terminal assigned to the MULAP line, the MULAP call number being converted by the communications installation;

carrying out the order for the MULAP call number as an order for the converted call number; and sending all messages from the communication installation to the CTI application, which relate to the MULAP line, as messages associated with the master terminal.

2. The method as claimed in claim 1, wherein when a MULAP line is accessed by a terminal other than the master terminal for the MULAP line, a message is generated as a message which relates to the master terminal for the MULAP line being accessed.

3. A system comprising:

a plurality of MULAP lines having respective MULAP call numbers;

a plurality of terminals having respective terminal call numbers, each of the terminals having access to the MULAP lines, each of the MULAP lines having a respective associated terminal as a master terminal;

an application to send an order for a MULAP call number; and a communication installation to receive the order from the application, to convert the MULAP call number of the order into the terminal call number of the master terminal associated with the MULAP line identified by the MULAP number, to use the MULAP call number in communications with the application and to use the terminal call number in communications with the MULAP line.

4. A method for managing MULAP multiple line appearance lines in a communication installation using an application, comprising:

providing a plurality of terminals with access to each MULAP line through a MULAP call number associated with the MULAP line being accessed, each terminal having a respective terminal call number;

assigning one of the terminals to each MULAP line as a master terminal;

sending an order from the application for a MULAP call number to the communication installation;

converting the MULAP call number into a converted call number, the converted call number being the terminal call number of the master terminal assigned to the MULAP line associated with the MULAP call number;

using the converted call number within the communications installation for all messages relating to the MULAP line associated with the master terminal;

sending all messages, which relate to the MULAP line associated with the master terminal, from the communication installation to the application as messages associated with the MULAP call number.

* * * * *